Nov. 2, 1954  F. A. KROHM  2,693,118
CRANK ASSEMBLY FOR WINDSHIELD WIPER MOTORS
Original Filed Nov. 10, 1949
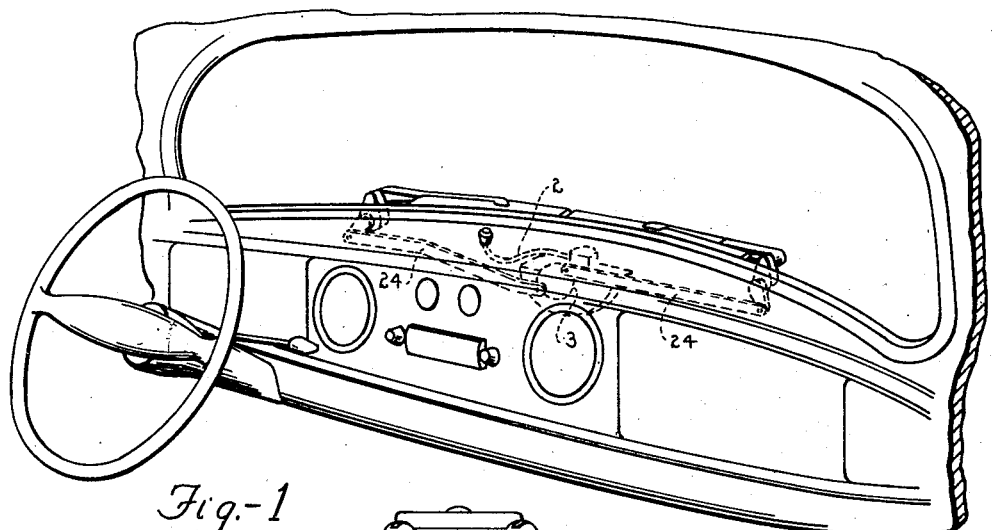
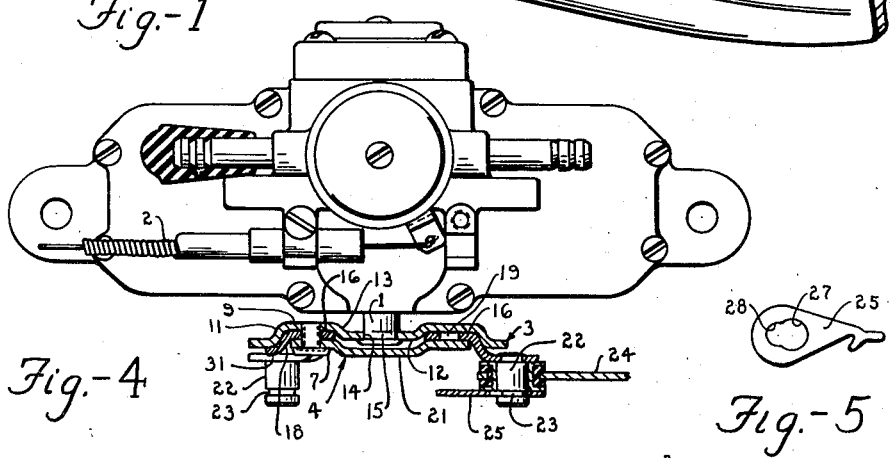
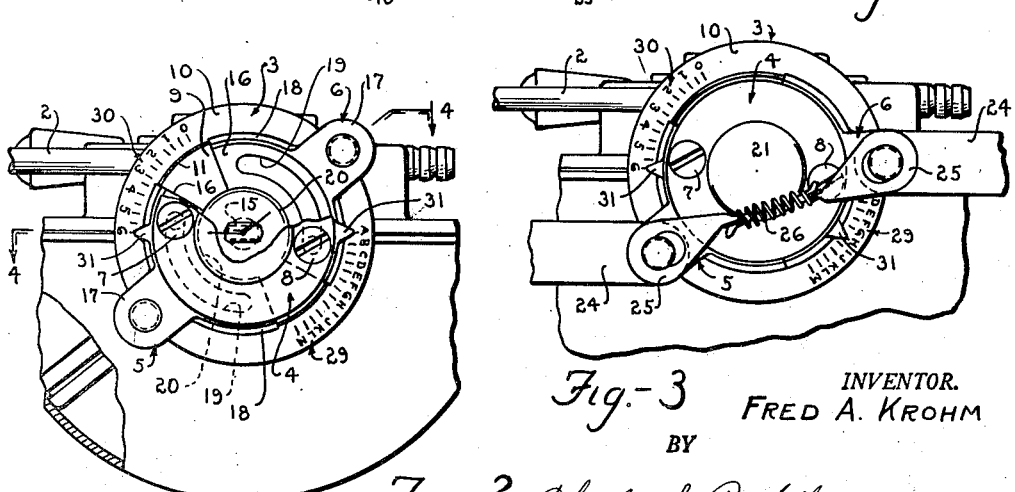
INVENTOR.
FRED A. KROHM
BY
Charles S. Penfold
ATTORNEY

United States Patent Office 2,693,118
Patented Nov. 2, 1954

2,693,118

CRANK ASSEMBLY FOR WINDSHIELD WIPER MOTORS

Fred A. Krohm, Gary Ind., assignor to Productive Inventions, Inc., a corporation of Indiana Original application November 10, 1949, Serial No. 126,613. Divided and this application December 14, 1949, Serial No. 132,887

13 Claims. (Cl. 74—522)

This invention is directed to improvements in windshield wiper motors.

Practically every motor vehicle included in the more than 40,000,000 now in service is equipped with a power unit or motor employed to drive a windshield wiper.

These motors develop disabling disorders, from wear and other causes, and must be replaced—millions of them every year. By far the smaller part of the number of motors are electrically driven. The balance, probably more than 30,000,000 in all, are driven by vacuum.

Probably more than 99% of all the vacuum motors in service today, either as original equipment or as later replacements, have been produced by a single manufacturer. Practically all vacuum wiper motor replacements up to the date of the filing of this application have had to be exact replicas of the motor used for original equipment.

Due to varying engineering requirements of vehicle manufacturers such original equipment vacuum motors have varied in power, in dimensions and in other important characteristics including the positions, with relation to each other and to the motor, of the crank pins employed to drive, largely through conventional types of linkage assemblies, the two arms and blades (right and left) used on nearly all windshields.

Due to these and other variations in construction of original equipment motors it would be necessary today for a retail service station making vacuum motor replacements in kind to carry in stock many more than 100 different vacuum windshield wiper motors of a common make, not one of which is recommended or normally usable in substitution for any other one of the group.

As a result wholesalers and retailers of replacement vacuum motors attempting to give broad service are required to carry heavy investments in motor inventory occupying much space and requiring much attention in ordering for inventory replacements. Between the wholesaler and the retailer, inventory deficiencies occasion serious delays in making needed motor replacements and thus delay effecting desirable reduction in driving hazards.

Because of difficulty in maintaining complete inventories of replacement vacuum motors for full service range, retailers, perhaps in more instances than otherwise, after ascertaining customer-car-owner's need for a vacuum motor, are required to make a special trip to a wholesaler, perhaps in another town, to get the particular motor. The wholesaler in his turn is often required to procure the motor from a distant "master" or "central" warehouse—all of which occasions delay and requires time-consuming effort and excessive expense, often exceeding in cost the value of the motor itself and perhaps seldom leaving any compensation for the reseller.

As emphasizing particularly the purpose and utility of the subject invention, a very large number of separate, special and different crank arms have heretofore been recommended for the retailer to carry for the purpose of completing the manufacture, by the dealer, of vacuum motors to adapt them to desired installations. Even with these many different crank levers the service retailer encounters a very large percentage of motor vehicles to which none of the crank levers in his stock will accommodate the motor.

The subject invention not only avoids the necessity for keeping available in resellers' stocks large assortments of different crank levers but it also minimizes the need for replacing worn linkages to prevent the blade from slapping against the windshield frame, thus effecting a substantial further saving in time and money for the car owner, and avoiding, as is frequently necessary, expenditures of time and money in obtaining from a distant reseller the particular linkage required for the installation.

Thus a primary object of the invention is to overcome the disadvantages above referred to by providing a single motor that will serve (without either removing or adding special parts, adapters and/or attachments) as a replacement for any one of many different models or original equipment motors. More particularly, an object is to provide a motor, with an improved crank device which is readily connectable with linkage assemblies of different designs without removing or adding special parts, adapters and/or attachments, as a replacement for any one of many different models of original equipment motors.

An object of the invention is to provide a unique crank device in which the crank pins may be adjusted with respect to each other. More specifically in this respect the crank device preferably includes a supporting member connectable with a shaft for rotation therewith, a locking member connected to the supporting member, and a pair of substantially corresponding crank arms carrying the crank pins, the arms having portions preferably disposed between the supporting member and locking member in such a manner that the arms may be rotatably adjusted to any position desired and then locked in place.

Other objects and advantages of the invention will become apparent after the description hereinafter set forth is considered in conjunction with the drawings annexed hereto.

Referring to the drawings, wherein like parts are designated by the same numerals:

Figure 1 is a diagrammatic view of an instrument panel of an automotive vehicle exemplifying a motor, embodying the invention;

Figure 2 is a front view in elevation of the crank assembly as applied to the drive shaft of the motor;

Figure 3 is a view similar to Figure 2 showing cranks of the assembly operatively connected to bars of a linkage assembly and the fact that one crank is adjusted to a position different from that depicted in Figure 2;

Figure 4 is a transverse section taken substantially on line 4—4 of Figure 2 exemplifying details of construction; and Figure 5 illustrates a view of one of the elements of the holding means employed for detachably connecting the bars or links of the linkage assembly to the crank assembly.

This application is a division of my application entitled Fluid Operated Windshield Wiper Motor, Serial 126,613, filed November 9, 1949.

The motor structure exemplified in the drawings includes, among other things, a shaft 1 which supports a vane oscillated by differential fluid pressures. A flexible actuating member 2 is provided for operating a valve to control the pressures to regulate the oscillating speed of the shaft.

The novel crank assembly adapted to be operatively connected with the shaft 1 and different types of linkages includes, a supporting member 3, a plate member 4, a pair of corresponding relatively adjustable cranks 5 and 6 having inner portions disposed between the members, and screws 7 and 8 for securing the cranks to the supporting member. The supporting member is made preferably round and is recessed to provide a bottom wall 9 and a flat border flange 10 which are joined by an inclined wall 11, the bottom wall and flange being arranged substantially parallel. The bottom wall 9 is provided with a pair of diametrically disposed threaded apertures which receive the shanks of the screws 7 and 8. The supporting member is further formed with a centrally located round boss 12 having an inclined wall 13 which merges with the bottom wall. The inclined walls 11 and 13 and bottom wall 9 define an annular track having a predetermined width. This boss is provided with an oblong hole 14 which receives a reduced oblong portion 15 of the shaft 1 and the end of this portion is upset to preferably permanently anchor the supporting member for rotation with the shaft.

The cranks are preferably substantially identical in character and each includes an inner arcuate flat base portion 16 which bears against the bottom wall 9 of the track and an arm 17 which extends radially outwardly across and in spaced relationship to the border flange. Each crank is also provided with an arcuate inclined flange 18 which merges with the arm. The base portion 16 of each crank is provided with an arcuate slot 19 and an arcuate notch 20, the radii of which are coincident with the center of the supporting member. The threaded shanks of the screws extend through clearance holes provided therefor in the plate member 4, through the arcuate slots 19 in the inner base portions 16 of the cranks and into the threaded apertures provided in bottom wall 9 of the supporting member 3. The central portion of the plate member 4 is preferably provided with a boss 21 to provide clearance for the upset end of the shaft 1.

The width of the base portion 16 of each crank is preferably predetermined in a manner similar to that of the annular track formed in the supporting member so that when the cranks are properly located and secured in place on the supporting member by the plate 4 and screws 7 and 8 the inclined flanges 18 on the cranks will be caused to forcibly engage the inclined wall 11 on the supporting member and the marginal edges defining the notches 20 of the cranks will receive the boss portion 12 and forcibly engage the inclined wall 13 thereof. The peripheral edge of plate 4 is also adapted to forcibly engage the inner surfaces of the flanges 18 on the cranks to assist the locking action. The heads of the screws 7 and 8 are preferably of the binding type and assist in locking the cranks in place.

The radial arm 17 of each crank is provided with an aperture which receives the reduced end of a cylindrical aperture which receives the reduced end of a cylindrical crank pin 22, the reduced end of each pin being preferably upset to permanently anchor the pins with their axes arranged parallel to the longitudinal axis of the motor shaft 1. The outer end of each pin is preferably formed with an annular groove to provide a neck portion 23. The inner extremities of links or bars 24 of a linkage assembly provided with holes which rotatably receive the crank pins 22. Retaining means comprising a pair of holding members 25 joined by a helical spring 26 serve to detachably secure the links or bars 24 to the pins 22. Each holding member is provided with a keyhole slot which includes an entrance opening 27 of a size to permit the member to be telescoped over a pin and an opening 28 of a size to accommodate the neck portion 23.

With this novel arrangement all of the components of the crank assembly will at all times be operatively connected together so that by merely loosening the screws 7 and 8 the cranks may be manually moved to any desired position and then locked in place by tightening the screws. The construction is such that by using an appropriate chart one may determine in advance the relative rotative positions the cranks should be adjusted to for connection with a particular type of linkage assembly. More specifically in this respect, means are provided whereby either crank may be dialed to any desired position within practicable limits. The dialing means herein illustrated preferably includes lettered graduations 29 and numerated graduations 30 provided on the face of the border flange 10 of the supporting member 3. The crank 5 is provided with a pointer 31 spaced from its arm 17 for registry with the graduations 29 and the crank 6 is provided with a corresponding pointer for registry with graduations 30. With these unique provisions the pointer 31 on crank 5 may, for example, be moved to register with a graduation A and the pointer of crank 6 in registry with graduation 12, as exemplified in Figure 2 of the drawings, to place the crank pins 22 in their proper relative positions for connection with the inner extremities of the links or bars 24 of a particular linkage assembly whereby to obtain the desired ranges of oscillatory movement of a pair of wiper arms and blades adapted to be actuated through the intermediation of such assembly. The components of the assembly are so constructed and arranged that after the cranks are adjusted to their respective positions they can be firmly held and locked in place. It is to be understood that the holding or locking action may be such that crank 5, for example, may be adjusted by merely loosening the screw 7 and then tightening it without disturbing the previous set or locked position of the crank 6 and vice versa.

Having thus described my invention it is obvious that various modifications may be made in the same without departing from the spirit of the invention, and, therefore, I do not wish to be understood as limiting myself to the exact form, construction, arrangement, and combination of parts herein shown and described and defined in the claims.

I claim:

1. A windshield wiper motor having an oscillatory actuating shaft, a support carried by the shaft, crank arms mounted on said support and being freely adjustable arcuately and relatively to each other about the axis of the shaft, and means for maintaining the relative positions of the crank arms for movement with the actuating shaft, said means comprising a member overlying the crank arms and fastening elements connecting the member to the support.

2. A windshield wiper motor having an oscillatory actuating shaft, a support carried by the shaft and provided with crank arms arcuately adjustable relatively to each other in an infinite number of positions, means for maintaining the relative positions of the crank arms on the support, said means comprising a member overlying the crank arms and fastening elements connecting the member to the support, a crank pin adjacent the outer end of each crank arm, and retaining means adjacent the end of each crank pin.

3. A windshield wiper motor having an oscillatory shaft, a disc member fixed for oscillation with the shaft, crank arms carried by the disc member and being freely adjustable arcuately relative to the disc member and to each other, a crank pin adjacent the outer end of each crank arm, retaining means adjacent the outer end of each crank pin, and means for fixing the crank arms to the disc member in their selected relative positions for oscillation with the disc member, said last-mentioned means comprising a plate overlying the crank arms and fasteners connecting the plate to said disc member.

4. A supporting member provided with means for connecting it to the shaft of a windshield wiper motor including a part having means to which a driven element may be connected, a crank having an inner portion overlying the member and an exposed outer portion, said outer portion also being provided with means to which a driven element may be connected, a non-rotatable holding member overlying the inner portion of the crank, and means connecting the supporting member and the holding member together, said connecting means and said members being of such a character that when the connecting means is loosened the crank may be bodily shifted with respect to the supporting member and said part and when tightened the inner portion of said crank will be locked between the supporting member and the holding member.

5. A fluid pressure windshield wiper motor having an oscillatory actuating shaft provided with a fixed supporting member and a crank assembly comprising separate crank arms freely and arcuately movable manually about the axis of said actuating shaft relatively to each other, and means for fixing the crank arms to the supporting member for movement with said actuating shaft in their respective selected positions, said means comprising an element overlying the crank arms and means for fastening the element to the member.

6. A windshield wiper motor having an actuating shaft, a supporting member mounted on said shaft for movement therewith, a plurality of cranks having portions overlying the supporting member, said cranks being provided with means to which driven elements may be attached, a single locking member overlying said cranks, and means connecting the supporting member and the locking member, said connecting means being so designed and constructed that when loosened the cranks may be bodily shifted with respect to each other and to said members and when tightened the cranks will be clamped between said members and fixed for movement therewith.

7. A windshield wiper motor actuating shaft, a round cup member mounted on said shaft for movement therewith and disposed in a plane substantially transverse to the longitudinal axis of the shaft, a plurality of cranks having inner substantially arcuate portions disposed in the cup member and outer lateral portions arranged exteriorly of the cup, said lateral portions being provided with means to which a driven element may be operatively connected, openings provided in the arcuate portions of said cranks, and fastening means extending through the openings and connected to the cup member, the construction and arrangement being such that when the fastening means is merely loosened either crank may be moved to any one of a number of infinite positions within the arc of a circle and when tightened will lock the cranks in the position in which either or both may have been adjusted.

8. A windshield wiper motor having an actuating shaft, a supporting member on said shaft for movement therewith, a plurality of cranks having inner portions disposed on the supporting member and having outer portions arranged exteriorly of the member, said outer portions being provided with attachment means, openings provided in the inner portions, and fastening means common to both cranks extending through the openings and connected to the member, the construction and arrangement being such that when the fastening means is loosened but not disconnected from the member the cranks may be moved to different positions within a predetermined range and then locked in place by tightening said fastening means.

9. A windshield wiper motor actuating shaft, a supporting member mounted on said shaft for movement therewith and disposed in a plane substantially transverse to the longitudinal axis of the shaft, a plurality of cranks having inner portions superimposed on the member and outer lateral portions, each of said lateral portions being provided with means to which a driven element may be operatively connected, openings provided in the inner portions of said cranks, means common to both cranks overlying their inner portions, openings in the common means, and fastening means extending through all the said openings and connected to the supporting member, the construction and arrangement being such that when the fastening means is merely loosened either crank may be moved to any position desired and when tightened will lock the cranks in the position in which either or both may have been adjusted.

10. A clamping assembly comprising a support provided with means for attaching the assembly to an actuating shaft, a member, a pair of cranks having portions arranged for selective adjustment between the support and member and portions provided with means for connecting the cranks to elements to be operated, and means for drawing the support and member together to lock the cranks in place after adjustment.

11. The structure defined in claim 10, in which the cranks and support are each provided with means for determining certain positions in which the cranks should be locked.

12. A crank assembly comprising a pair of clamping plates, said assembly provided with means for attaching the assembly to an actuating shaft, a pair of crank arms having portions disposed between the plates, and means for adjusting the plates so that the crank arms can be moved and secured in different operative positions with respect to the plates.

13. A support adapted for connection with an oscillatory shaft of a windshield wiper motor, crank arms mounted on said support and being freely adjustable arcuately and relatively to each other about the center of the support, and means for maintaining the relative positions of the crank arms on the support, said means comprising a member overlying the crank arms and fastening elements connecting the member to the support.

References Cited in the file of this patent

UNITED STATES PATENTS

| Number | Name | Date |
| --- | --- | --- |
| 215,980 | Scott | May 27, 1879 |
| 1,618,786 | Sooy | Feb. 22, 1927 |
| 2,316,070 | Horton | Apr. 6, 1943 |
| 2,379,796 | Freeman | July 3, 1945 |
| 2,493,552 | Sacchini | Jan. 3, 1950 |

FOREIGN PATENTS

| Number | Country | Date |
| --- | --- | --- |
| 209,161 | Great Britain | Jan. 3, 1924 |